US012529999B2

(12) United States Patent
Collins et al.

(10) Patent No.: US 12,529,999 B2
(45) Date of Patent: Jan. 20, 2026

(54) WEARABLE ELECTRONIC DEVICE FOR PROVIDING DEPTH CHANGE FEEDBACK

(71) Applicant: Garmin International, Inc., Olathe, KS (US)

(72) Inventors: Paul Benjamin H. Collins, Venice, CA (US); Patrick M. Danko, Overland Park, KS (US); Mark W. Gepner, Tonganoxie, KS (US); Cody D. Jung, Olathe, KS (US); Daniel D. Jones, Lawrence, KS (US)

(73) Assignee: Garmin International, Inc., Olathe, KS (US)

( * ) Notice: Subject to any disclaimer, the term of this patent is extended or adjusted under 35 U.S.C. 154(b) by 379 days.

(21) Appl. No.: 17/930,573

(22) Filed: Sep. 8, 2022

(65) Prior Publication Data

US 2024/0085855 A1 Mar. 14, 2024

(51) Int. Cl.
*G04B 47/06* (2006.01)
*G04G 21/02* (2010.01)

(52) U.S. Cl.
CPC ......... *G04B 47/066* (2013.01); *G04B 47/061* (2013.01); *G04G 21/02* (2013.01)

(58) Field of Classification Search
CPC .... G04G 21/02; G04B 47/061; G04B 47/066; G04B 47/06; A63B 2244/20; A63B 2220/13; B63C 11/02; B63C 11/00
USPC ............................................................ 368/10
See application file for complete search history.

(56) References Cited

U.S. PATENT DOCUMENTS

| | | | | | |
|---|---|---|---|---|---|
| 4,352,168 | A * | 9/1982 | Anderson | G01L 9/0033 | 341/16 |
| 5,103,685 | A * | 4/1992 | Wright | G01C 5/06 | 73/865.1 |
| 5,559,761 | A * | 9/1996 | Frenkel | G04G 21/06 | 368/230 |

(Continued)

FOREIGN PATENT DOCUMENTS

| | | | | |
|---|---|---|---|---|
| CN | 105444812 A * | 3/2016 | | |
| KR | 20090071468 A * | 7/2009 | | G04G 21/02 |
| WO | WO-0059779 A1 * | 10/2000 | | B63C 11/02 |

OTHER PUBLICATIONS

Printout from https://en.wikipedia.org/wiki/Variometer published prior to Sep. 8, 2022.

(Continued)

*Primary Examiner* — Edwin A. Leon
*Assistant Examiner* — Kevin Andrew Johnston
(74) *Attorney, Agent, or Firm* — Samuel M. Korte; Max M. Ali; Kathleen D. Fitterling

(57) ABSTRACT

A wearable electronic device comprises a housing, a feedback device, a depth sensor, and a processing element. The feedback device is located in the housing and configured to generate a vibration. The depth sensor is configured to generate a signal indicative of a current depth of the housing. The processing element is in electronic communication with the feedback device and the depth sensor. The processing element is configured to determine the current depth based on the signal indicative of a current depth and control the feedback device to generate the vibration in a pattern indicative of a rate of change in depth based at least in part on the current depth.

18 Claims, 5 Drawing Sheets

(56) References Cited

U.S. PATENT DOCUMENTS

| | | | | |
|---|---|---|---|---|
| 6,154,140 | A * | 11/2000 | Thorpe | G08B 21/088 340/626 |
| 7,383,150 | B2 * | 6/2008 | Angelini | B63C 11/32 702/50 |
| 10,358,199 | B1 | 7/2019 | Kleinigger | |
| 10,611,445 | B1 | 4/2020 | Earl | |
| 2007/0162254 | A1 * | 7/2007 | Hirose | B63C 11/02 702/155 |
| 2009/0015514 | A1 * | 1/2009 | Suzuki | B63C 11/02 345/3.1 |
| 2010/0064827 | A1 * | 3/2010 | Dakin | B63C 11/32 73/865.1 |
| 2013/0171927 | A1 * | 7/2013 | Bryant | H04B 13/02 455/40 |
| 2017/0249825 | A1 * | 8/2017 | Miyake | G08B 7/06 |
| 2020/0320608 | A1 * | 10/2020 | Handy Bosma | G06F 16/9535 |
| 2020/0387116 | A1 * | 12/2020 | Yamaguchi | G04G 21/02 |

OTHER PUBLICATIONS

Printout from https://www.oceanicworldwide.com/oceanic-plus-in-depth/?v=7516fd43adaa published prior to Sep. 8, 2022.

Printout from https://www8.garmin.com/manuals/webhelp/GUID-120241CE-9583-49CD-A0BC-8839B887F7CA/EN-US/Descent_Mk2_Mk2s_OM_EN-US.pdf published prior to Sep. 8, 2022.

* cited by examiner

WEARABLE ELECTRONIC DEVICE FOR PROVIDING DEPTH CHANGE FEEDBACK

BACKGROUND

While diving, a scuba diver often needs to know a current depth, and a free diver often has specific plans related to depth when performing a free dive. Typically, a depth gauge that measures depth is secured to the diver. The diver may look at the gauge during a dive to see the current depth and approximate whether the dive is going according to plan. However, it is often inconvenient for the diver to visibility monitor the gauge while diving.

SUMMARY

A wearable electronic device constructed according to an embodiment of the present technology comprises a housing, a feedback device, a depth sensor, and a processing element. The feedback device(s) is/are located in the housing and is configured to generate a vibration. The depth sensor is configured to generate a signal indicative of a current depth of the housing.

The processing element is in electronic communication with the feedback device and the depth sensor. The processing element is configured to determine the current depth based on the signal indicative of a current depth, and control the feedback device to generate the vibration in a pattern indicative of a rate of change in depth based at least in part on the current depth. By providing the vibration in a pattern indicative of the rate of change in depth, the diver is able to determine and/or approximate the ascent or descent rate and thereby determine whether the dive is going according to plan without having to look at the electronic device or gauge.

Another embodiment of the present technology provides a similar wearable electronic device with a memory element located in the housing and configured to store at least one previously determined depth, and the processing element is configured to determine a rate of change in depth based at least in part on a difference between the determined current depth and the at least one previously determined depth and to control the feedback device to generate the vibration in a pattern indicative of the rate of change in depth. By determining the rate of change in depth and generating the vibration in a pattern indicative of the rate of change of depth, the diver can determine a more precise approximation of the ascent or descent rate without having to look at the electronic device or gauge.

Another embodiment of the present technology provides a similar wearable electronic device with a memory element located in the housing and configured to store a vertical depth change notification distance, and the processing element is configured to control the feedback device to generate the vibration when the current depth is a multiple of the vertical depth change notification distance. By generating the vibration when the diver passes a vertical depth interval, the diver can intuitively determine a rate of ascent or descent and calculate a current depth by counting the number of vibrations without looking at the electronic device or gauge.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
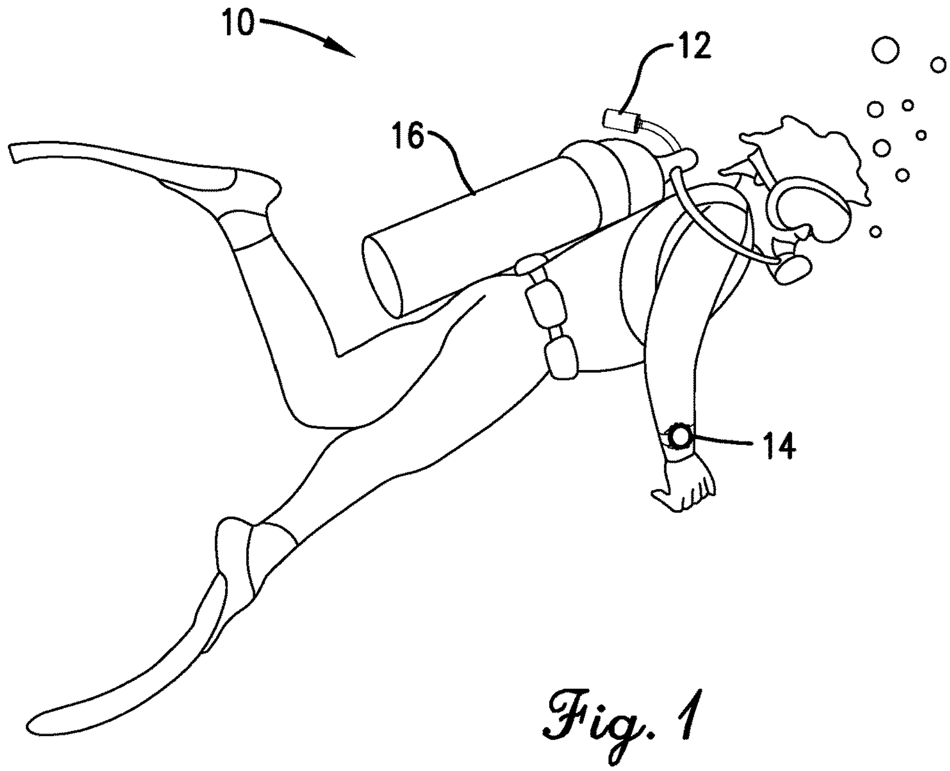
FIG. 1 is a view of an exemplary environment in which embodiments of the present technology would be implemented.

The drawing figures do not limit the present technology to the specific embodiments disclosed and described herein. The drawings are not necessarily to scale, emphasis instead being placed upon clearly illustrating the principles of the technology.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the claimed subject matter. The following detailed description is, therefore, not to be taken in a limiting sense. The scope of the claimed subject matter is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a wearable electronic device for monitoring the depth and/or the rate of ascent or descent of a diver during a dive and providing feedback to the diver. The wearable electronic device is configured to determine a current depth of the diver, determine a change in depth based at least in part on the current depth, and control a feedback device to generate the vibration in a pattern indicative of a rate of change in depth based at least in part on the determined change in depth. The feedback device may comprise a transducer operable to emit the vibration, which may be an audible tone and/or haptic feedback felt by the diver. The pattern indicative of the rate of change may include a number of vibrations over a period of time commensurate or proportional to a rate of ascent or descent. Alternatively or additionally, the pattern indicative of the rate of change may include a change in frequency of the vibrations, such as the pitch of an audible tone or the vibration frequency felt by the diver. Alternatively, the patterns may include a vibration every time the wearable electronic device determines the diver has passed a vertical depth interval while under water, e.g., every time the diver changes depth by 1 meter (m). The wearable electronic device may generally be worn on a wrist but can be configured to be worn elsewhere without departing from the scope of the claimed subject matter.

The wearable electronic device may also include a user interface configured to receive a selection of a rate of depth change notification threshold, a selection of a desired vertical depth change notification distance, or the like. The wearable electronic device may generate a vibration when the rate of ascent or descent exceeds the rate of depth change notification threshold. Further, the selection of a desired vertical depth change notification distance may adjust the vertical depth intervals at which the wearable electronic device generates a vibration. For example, the selection may change the interval from 10 m to 1 m, or the like, so that the wearable electronic device generates a vibration each time the diver changes depth by 1 m. The wearable electronic device may track the depth of the diver over time and/or the ascent or descent rate of the diver over time.

The wearable electronic device may be integrated into a system that includes a scuba tank pressure transmitter (e.g., tank pod). The wearable electronic device may broadcast depth information, such as the depth, ascent, and/or descent rate, utilizing the feedback device to the scuba tank pod. The wearable electronic device may utilize the same feedback device to emit audible alert tones to the diver which provide an indication to the diver of the rate of change in depth. The scuba tank pod may receive the depth information broadcast by the wearable electronic device. The scuba tank pod and/or the wearable electronic device may be configured to transmit the depth information to other devices, such as mobile devices, other scuba tank pods, other wearable electronic devices, or other devices, which may be outside of the water. Likewise, the wearable electronic device may be configured to transmit the depth information, and related information concerning the diver, to other devices.

Embodiments of the technology will now be described in more detail with reference to the drawing figures. Referring initially to FIG. 1, a system 10 in which embodiments of the present technology may be implemented is illustrated. The system 10 broadly comprises a scuba tank pod 12 and a wearable electronic device 14. The scuba tank pod 12 interfaces with a scuba tank 16 to detect internal air pressure of the scuba tank 16 during a dive. The wearable electronic device 14 may be embodied by an intelligent watch that is typically worn on a diver's wrist during a dive, although the wearable electronic device 14 may be worn on other parts of the body as well.

The scuba tank pod 12, shown in FIGS. 2-5, includes a housing 18, a fitting 20, an air pressure detector 22, a transducer element 24, a memory element 26, and a processing element 28. The scuba tank pod 12 may further include a battery to provide electric power to the electronic circuits and seals, such as O-rings, to make the scuba tank pod 12 water tight.

Figure 2:
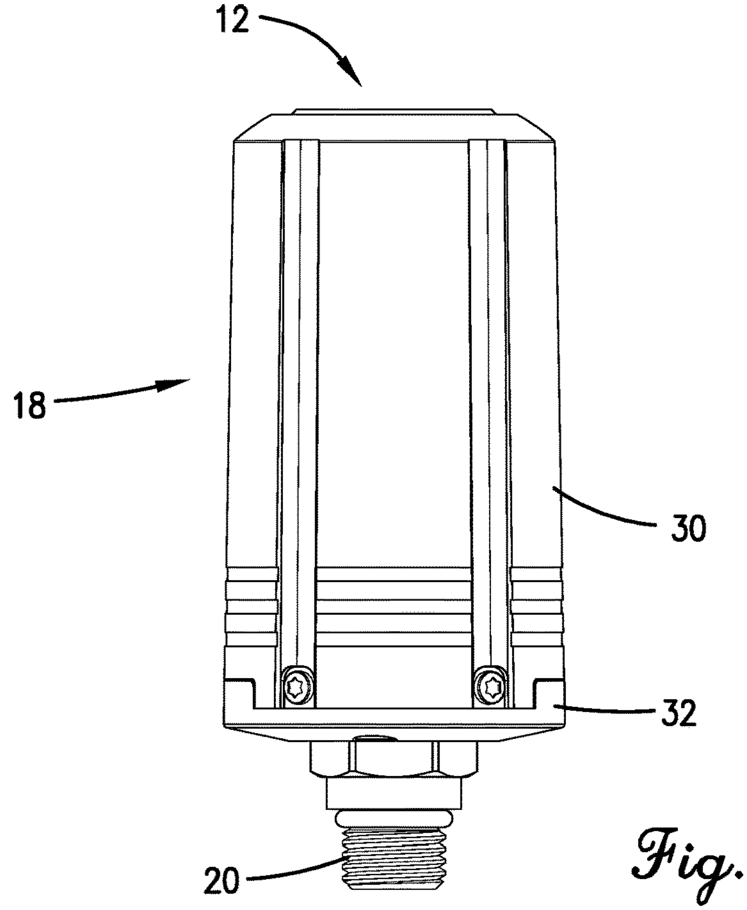
FIG. 2 is a front elevation view of a scuba tank pod illustrating a housing and a fitting to provide coupling to a scuba tank.
Figure 3:
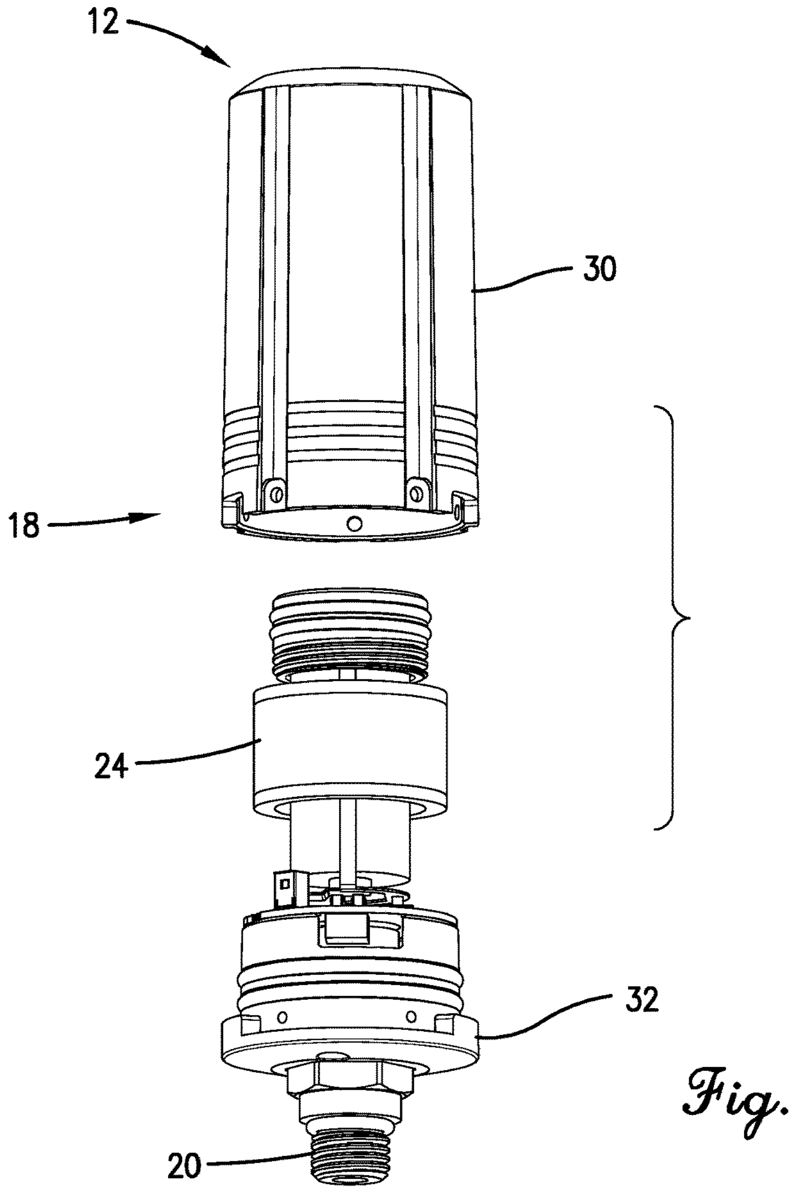
FIG. 3 is a perspective view of the scuba tank pod with a portion of the housing removed to illustrate a transducer element configured to transmit and receive sonar waves.
Figure 4:
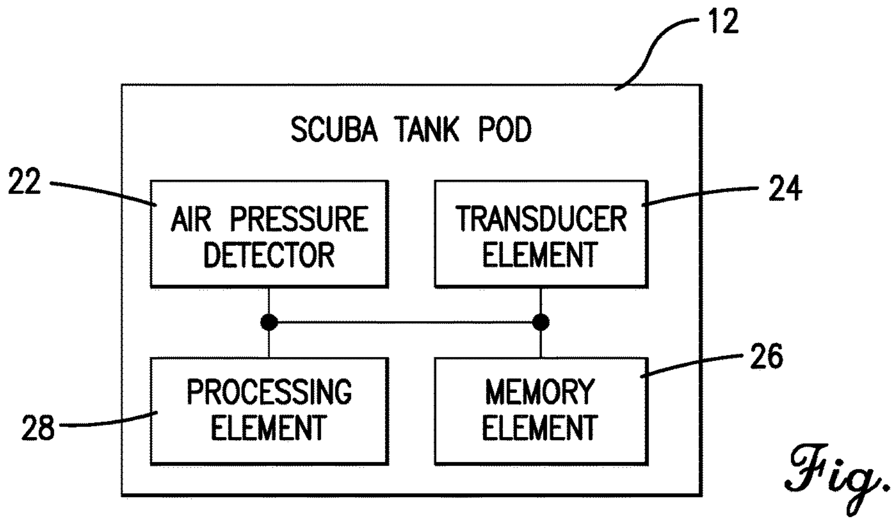
FIG. 4 is a schematic block diagram of various electronic components of the scuba tank pod.

The housing 18, shown in FIGS. 2 and 3, generally retains the electronic circuit components and exemplary embodiments include a cylindrical shell 30 which couples to a disc-shaped base 32 although other shapes or configurations are possible.

The fitting 20 extends from the base 32 of the housing 18 and includes a threaded connector that couples to an air supply hose (and/or directly to the regulator/valve assembly) which itself connects to the pressure port of the scuba tank 16 and allows the scuba tank pod 12 to interface with the scuba tank 16.

The air pressure detector 22 may include a pressure transducer or similar device that is responsive to air pressure. The air pressure detector 22 may receive input air pressure through the fitting 20 and output an air pressure electronic signal to the processing element 28.

The transducer element 24 may be formed from piezoelectric material, like ceramics such as lead zirconate titanate (PZT), barium titanate, lead titanate, lithium niobate, lithium tantalate, bismuth ferrite, sodium niobate, or polymers such as polyvinylidene difluoride (PVDF), which transform electrical energy into mechanical energy and vice-versa. In exemplary embodiments shown in FIG. 3, the transducer element 24 has a hollow cylindrical shape with a single circumferential side wall having an inner surface and an outer surface. The transducer element 24 is positioned within the housing 18 such that the outer surface of the transducer element side wall is adjacent to an inner surface of the shell 30.

The transducer element 24 may function as an acoustic pressure wave transmitter or an acoustic pressure wave receiver. When operating as an acoustic pressure wave transmitter, the transducer element 24 converts electrical energy into mechanical energy. The transducer element 24 receives a transmit electronic signal 36 as an input and emits, generates, transmits, or outputs sonar waves, such as pressure, acoustical, mechanical, and/or vibrational waves, with waveform characteristics, such as amplitude, frequency, waveshape, etc., that correspond to the waveform characteristics of the transmit electronic signal 36. Thus, the sonar waves may include data or other indications that are included in the transmit electronic signal. When operating as an acoustic pressure wave receiver, the transducer element 24 converts mechanical energy into electrical energy. That is, the transducer element 24 receives sonar waves impinging on one or more of its surfaces and outputs or communicates a receive electronic signal 38 with waveform characteristics that correspond to the waveform characteristics of the sonar waves. Thus, the receive electronic signal may include data or other indications that are included in the sonar waves. In various embodiments, the transmit and receive electronic signals may be analog signals with a periodically varying electric voltage. The transmit and receive electronic signals may include other periodically varying characteristics or parameters, such as electric current.

The transducer element 24 transmits and receives sonar waves having a plurality of frequencies. For example, the transducer element 24 transmits and receives sonar waves having frequencies in a first frequency range. The first frequency range may include ultrasonic frequencies which may range from approximately 30 kilohertz (kHz) to approximately 50 kHz. Typically, data is transmitted and/or received by the transducer element 24 at the first frequency range. The transducer element 24 also transmits and receives sonar waves having a second frequency range. The second frequency range may include audible frequencies ranging from approximately 1 kHz to approximately 10 kHz. Typically, alert tones are transmitted and/or received by the transducer element 24 at the second frequency range.

The memory element 26 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, optical disks, flash memory, thumb drives, universal serial bus (USB) drives, or the like, or combinations thereof. In some embodiments, the memory element 26 may be embedded in, or packaged in the same package as, the processing element 28. The memory element 26 may include, or may constitute, a "computer-readable medium". The memory element 26 may store the instructions, code, code statements, code segments, software, firmware, programs, applications, apps, services, daemons, or the like that are executed by the processing element 28. The memory element 26 may also store data that is received by the processing element 28 or the device in which the processing element 28 is implemented. The processing element 28 may further store data or intermediate results generated during processing, calculations, and/or computations as well as data or final results after processing, calculations, and/or computations. In addition, the memory element 26 may store settings, data, documents, sound files, photographs, movies, images, databases, and the like.

The processing element 28 may comprise one or more processors. The processing element 28 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 28 may generally execute, process, or run instructions, code, code segments, code statements, software, firmware, programs, applications, apps, processes, services, daemons, or the like. The processing element 28 may also include hardware components such as registers, finite-state machines, sequential and combinational logic, and other electronic circuits that can perform the functions necessary for the operation of the current technology. In certain embodiments, the processing element 28 may include multiple computational components and functional blocks that are packaged separately but function as a single unit. The processing element 28 may be in electronic communication with the other electronic components through serial or parallel links that include universal busses, address busses, data busses, control lines, and the like.

Figure 5:
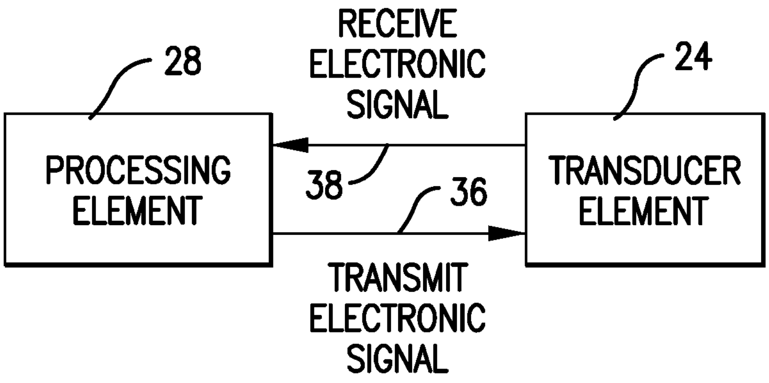
FIG. 5 is a schematic block diagram illustrating a plurality of electronic signals communicated between various electronic components of the scuba tank pod.

The processing element 28 may be operable, configured, or programmed to perform the following functions by utilizing hardware, software, firmware, or combinations thereof. With reference to FIG. 5, the processing element 28 controls the transducer element 24 to transmit data. The processing element 28 outputs or generates the transmit electronic signal 36 which is received by the transducer element 24. In some embodiments, the processing element 28 may further include, or be in electronic communication with, electronic signal processing components such as waveform generators, amplifiers, filters, ADCs, digital-to-analog converters (DACs), and the like. The electronic signal processing components may allow the processing element 28 to generate the periodic waveform voltage that will directly drive the transducer element 24.

The processing element 28 includes data in the transmit electronic signal 36 such that the transmit electronic signal 36 has a frequency in the first frequency range. The processing element 28 includes the data in the transmit electronic signal 36 on regular, periodic basis. The receive electronic signal 38 received by the processing element 28 may also include data regarding another diver when the transducer element 24 receives sonar waves from another pod 12, the wearable electronic device 14, or another device.

The receive electronic signal 38 may have electric voltage and/or electric current frequency and amplitude, as well as other waveform characteristics, that correspond, or vary according, to the sonar waves that impinge surfaces of the transducer element 24. The receive electronic signal 38 may be processed by the electronic signal processing components of the processing element 28 to be converted to digital data.

Figure 6:
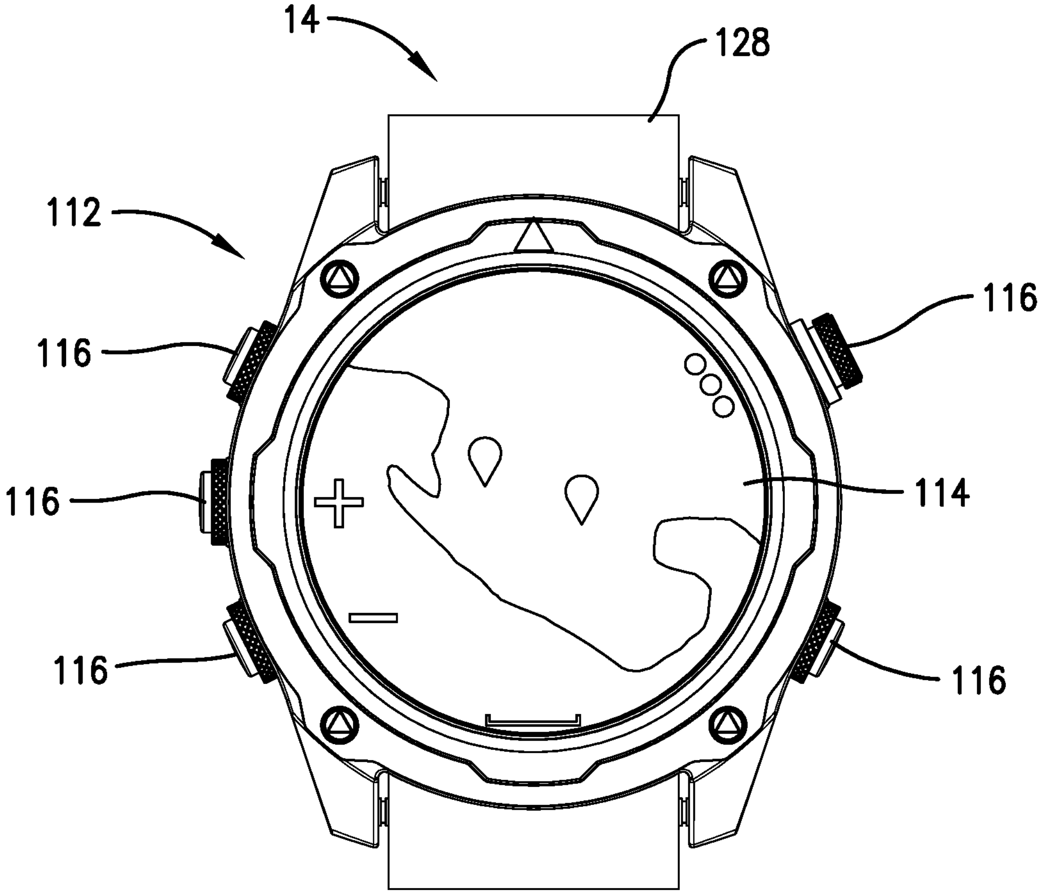
FIG. 6 is a top view of a wearable electronic device constructed according to an embodiment of the present technology.
Figure 7:
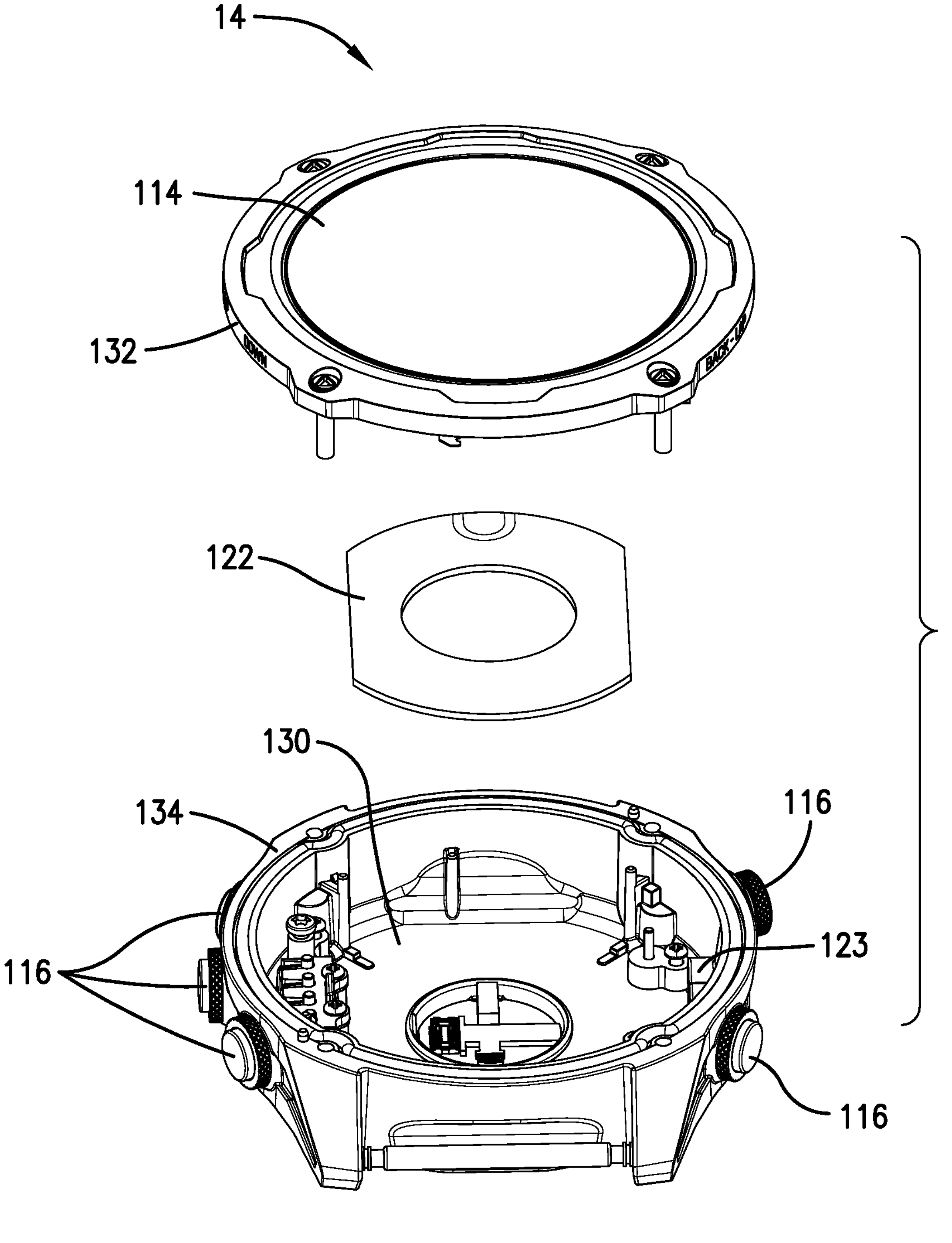
FIG. 7 is a perspective view of the wearable electronic device with a display and an upper wall of a housing removed to illustrate a feedback device configured to generate vibrations.
Figure 8:
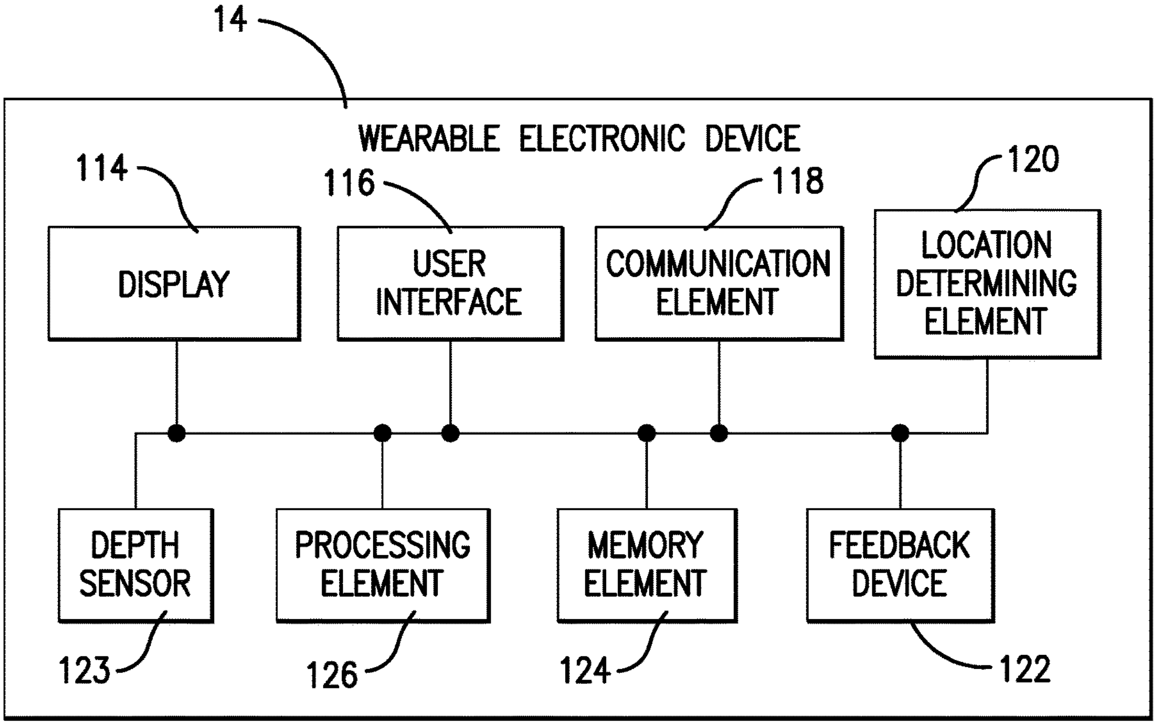
FIG. 8 is a schematic block diagram of various electronic components of the wearable electronic device.

The wearable electronic device 14, as shown in FIGS. 6-8, includes a housing 112, a display 114, a user interface 116, a communication element 118, a location determining element 120, a feedback device 122, a depth sensor 123, a memory element 124, and a processing element 126.

The housing 112 generally houses or retains other components of the wearable electronic device 14 and may include or be coupled to a wrist band 128. As seen in FIGS. 6 and 7, the housing 112 may include a bottom wall 130, an upper wall 132, and at least one side wall 134 that bound an internal cavity. The bottom wall 130 may include a lower, outer surface that contacts the user's wrist while the user is wearing the wearable electronic device 14. In some embodiments, such as the exemplary embodiments shown in the figures, the bottom wall 130 of the housing 112 may have a round, circular, or oval shape, with a single circumferential side wall 134. In other embodiments, the bottom wall 130 may have a four-sided shape, such as a square or rectangle, or other polygonal shape, with the housing 112 including four or more sidewalls.

The display 114 generally presents the information mentioned above, such as time of day, current location, and the like. The display 114 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In some embodiments, the display 114 may have a round, circular, or oval shape. In other embodiments, the display 114 may possess a square or a rectangular aspect ratio which may be viewed in either a landscape or a portrait orientation.

The user interface 116 generally allows the user to directly interact with the wearable electronic device 14 and may include a plurality of pushbuttons, rotating knobs, or the like. In various embodiments, the display 114 may also include a touch screen occupying the entire display 114 or a portion thereof so that the display 114 functions as at least a portion of the user interface 116. The touch screen may allow the user to interact with the wearable electronic device 14 by physically touching, swiping, or gesturing on areas of the display 114. The user interface 116 may be operable to receive an input representative of a desired vertical depth change notification distance. The desired vertical depth change notification distance may be a length at which a diver wants to be notified when the diver has traversed that length. For example, the diver may desire to be notified every time they ascend or descend 10 meters, and accordingly, the diver may set the desired vertical depth change notification distance to be 10 meters. Additionally or alternatively, the user interface 116 may be operable to receive a selection of a rate of depth change notification threshold. The rate of depth change notification threshold may be a rate of ascent or descent. For example, the diver may desire to be notified if they are descending or ascending beyond a desired rate, such as 0.5 meters per second, and accordingly, the diver may set the rate of depth change notification threshold to 1 knot.

The communication element 118 generally allows the wearable electronic device 14 to communicate with other computing devices, external systems, networks, and the like. The communication element 118 may include signal and/or data transmitting and receiving circuits, such as antennas, amplifiers, filters, mixers, oscillators, digital signal processors (DSPs), and the like. The communication element 118 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE) or 5G, Institute of Electrical and Electronics Engineers (IEEE) 802.11 standard such as WiFi, IEEE 802.16 standard such as WiMAX, Bluetooth™, or combinations thereof. In addition, the communication element 118 may utilize communication standards such as ANT, ANT+, Bluetooth™ low energy (BLE), the industrial, scientific, and medical (ISM) band at 2.4 gigahertz (GHz), sonar or ultrasonic communication protocols, or the like. The communication element 118 may be in electronic communication with the memory element 124 and the processing element 126.

The location determining element 120 generally determines a current geolocation of the wearable electronic device 14 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 120 may accompany or include an antenna to assist in receiving the satellite signals. The antenna may be a patch antenna, a linear antenna, or any other type of antenna that can be used with location or navigation devices. The location determining element 120 may include satellite navigation receivers, processors, controllers, other computing devices, or combinations thereof, and memory. The location determining element 120 may process a signal, referred to herein as a "location signal", from one or more satellites that includes data from which geographic information such as the current geolocation is derived. The current geolocation may include coordinates, such as the latitude and longitude, of the current location of the wearable electronic device 14. The location determining element 120 may communicate the current geolocation to the processing element 126, the memory element 124, or both.

Although embodiments of the location determining element 120 may include a satellite navigation receiver, it will be appreciated that other location-determining technology may be used. In some configurations, the location determining element 120 may couple with feedback device 122 to directly or indirectly determine location. For example, location determining element 120 and feedback device 122 may be configured to receive sonar signals from known positions (e.g., beacons from fixed locations, beacons from a boat having a known location, beacons from another diver having a known location, etc.) and calculate its position based the one or more received sonar signals. In other configurations, cellular towers or any customized transmitting radio frequency towers can be used instead of satellites may be used to determine the location of the wearable electronic device 14 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 120 may also include or be coupled with a pedometer, accelerometer, compass, or other dead-reckoning components which allow it to determine the location of the wearable electronic device 14. The location determining element 120 may determine the current geographic location through a communications network, such as by using Assisted GPS (A-GPS), or from another electronic device. The location determining element 120 may even receive location data directly from a user.

The feedback device 122 is operable to generate vibrations to present an indication of a rate of change in depth. In some examples, the feedback device 122 may be integrated with the wearable electronic device 14, such as by being retained within its housing 112. However, in other examples, the feedback device 122 may be physically separate from the wearable electronic device 14 and provide diver feedback independent of the other functions provided by the wearable electronic device 14. For instance, the feedback device 122 may be configured as a standalone pod that attaches to any part of diver, may be integrated with the diver's goggles or other equipment, etc. In such examples, the feedback device 122 may communicate with the diver's other electronic equipment, such as a diver computer or dive watch.

The vibrations provided by the feedback device 122 may include audible tones that can be heard by the diver and/or haptic vibrations that can be felt by the diver. The feedback device 122 may be operable to generate vibrations at different frequencies, such as audible tones with different pitches and/or haptic vibrations with different frequencies. Further, the feedback device 122 may be operable to generate vibrations with various amplitudes, such as louder or quieter audible tones or haptic vibrations at differing intensities. The feedback device 122 may generate continuous vibrations at one or more frequencies and/or be configured to generate vibrations only at periodic or dynamic intervals. In some examples, the feedback device 122 includes a transducer operable to generate vibratory frequencies in the audible range (audible tones) that can be heard by the diver underwater. The transducer may by also or alternatively be capable of generating vibratory frequencies that may be physically perceived by the diver, such as through vibrations felt on the diver's wrist. However, the feedback device 122 may employ any haptic device, including rotational and linear mechanical weights, buzzers, and the like, to generate the vibrations described herein.

In exemplary embodiments shown in FIG. 7, the feedback device 122 may be formed from piezoelectric material and may have a roughly planar disc shape with a central opening and diametrically opposing flat edges. The feedback device 122 is positioned adjacent to an upper surface of the bottom wall 130 of the housing 112. While the depicted feedback device 122 is depicted as being planar, the feedback device 122 may have any shape without departing from the scope of the claimed subject matter. Additionally, the feedback device 122 may be formed of any material and comprise any type of transducer or actuator without departing from the scope of the claimed subject matter. For example, the feedback device 122 may alternatively include a motorized device with an eccentric mass attached to a motor shaft, or the feedback device 122 may include a coin shaped micro drive vibration motor.

Like the transducer element 24, the feedback device 122 can also transmit sonar waves in response to receiving a transmit electronic signal 136, wherein the waveform characteristics, such as amplitude, frequency, wave shape, etc., of the sonar waves correspond to the waveform characteristics of the transmit electronic signal 136. The feedback device 122 also receives sonar waves impinging on one or more of its surfaces and outputs or communicates a receive electronic signal 138 with waveform characteristics that correspond to the waveform characteristics of the sonar waves. At some times, the feedback device 122 receives sonar waves from the scuba tank pod 12, wherein the sonar waves may include depth information and accordingly, the receive electronic signal 138 includes the depth information. In some examples, the feedback device 122 includes transducer element 24.

The depth sensor 123 is configured to generate a signal indicative of a current depth of the housing 112. The depth sensor 123 may include a pressure transducer or similar device that is responsive to water pressure. The depth sensor 123 may receive input water pressure through a port in the housing 112. Given that the housing 112 is secured to the diver during operation of the wearable electronic device 14, the depth sensor 123 detects or senses the water pressure as experienced by the diver on a continuous or regular periodic basis. The depth sensor 123 may output a water pressure electronic signal 134 that includes an analog electric voltage and/or electric current which varies according to a level of water pressure. Alternatively, the depth sensor 123 may include, or be in electronic communication with, an analog-to-digital converter (ADC) which converts the analog electric voltage and/or electric current to digital data, typically generated in a stream. Thus, the water pressure electronic signal 134 may include digital data that indicates the depth of the diver. In certain embodiments, the data indicating the water pressure is included in the water pressure electronic signal 134 on a regular, periodic basis.

In addition to or as an alternative to the pressure sensor described above, the depth sensor 112 may include other attitude, positioning, or sensing elements to generate the signal indicative of the current depth of the housing 112. For example, in some configurations, the depth sensor 112 may include an accelerometer configured to measure acceleration of the housing 112. Such acceleration information, and the corresponding signals generated by the depth sensor 112, may indicate the current depth of the housing 112 by relating to relative changes in the diver's depth. For example, zero acceleration, in one or more axes, may indicate that the diver is not changing depth. While acceleration, as a total magnitude or along one or more axes, may indicate ascent or descent. Utilizing this acceleration information, the processing element 126 can control the feedback device 122 to generate the various vibratory functionality described herein. In some configurations, the accelerometer may be utilized without requiring a pressure sensor. In other configurations, the accelerometer can be used in combination with a pressure sensor or other sensing element.

The memory element 124 may be substantially similar to the memory element 26 in structure. The memory element 124 may be configured to store the water pressure data, depth data, ascent or descent rates, the desired vertical depth change notification distance, the rate of depth change notification threshold, or the like.

The processing element 126 may be substantially similar to the processing element 28 in structure. Thus, the processing element 126 may include, or be in electronic communication with, electronic signal processing components such as waveform generators, amplifiers, filters, ADCs, digital-to-analog converters (DACs), and the like. The processing element 126 may be operable, configured, or programmed to perform the following functions by utilizing hardware, software, firmware, or combinations thereof.

Figure 9:
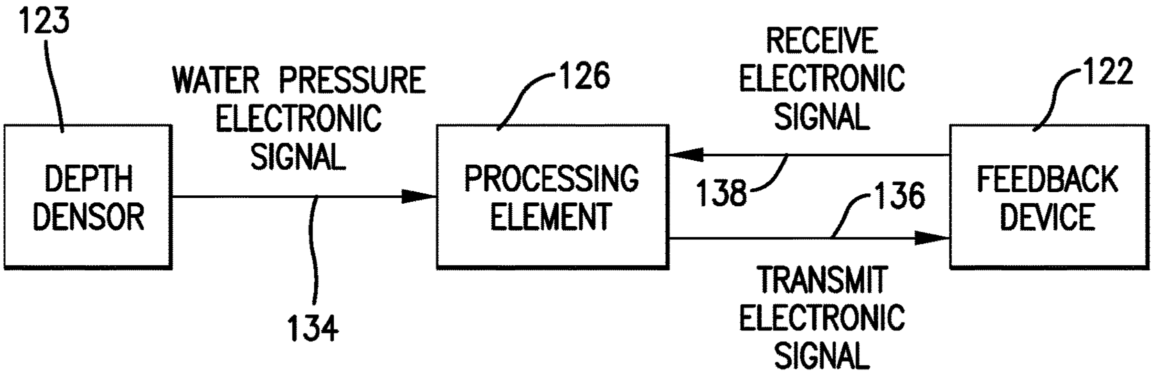
FIG. 9 is a schematic block diagram illustrating a plurality of electronic signals communicated between various electronic components of the wearable electronic device.

With reference to FIG. 9, the processing element 126 receives the water pressure electronic signal 134 from the depth sensor 123. In some embodiments, if the water pressure electronic signal 134 includes analog electric voltage and/or electric current levels indicating the water pressure as experienced by the diver, then the processing element 126 may further include, or be in electronic communication with, one or more ADCs to convert the analog levels to digital data ("water pressure data"). In other embodiments, the water pressure electronic signal 134 already includes water pressure data. Given the water pressure data as input, the processing element 126 may utilize or apply algorithms, artificial intelligence, mathematical equations, and the like to calculate, compute, or determine depth related parameters, information, or data, such as a current depth of the housing 112, a rate of descent of the housing 112 or diver, a rate of ascent of the housing 112 or diver, one of more previous depths, and so forth. At least a portion of the water pressure data and/or the calculated parameters may be stored in the memory element 124.

For example, the processing element 126 may receive the water pressure electronic signal 134 and determine the current depth based at least in part on the water pressure electronic signal 134. However, the processing element 126 may determine the current depth based on other data from other sensors without departing from the scope of the claimed subject matter. For example, the processing element 126 may determine the current depth based on data from accelerometers, gyroscopes, or the like.

The processing element 126 may additionally or alternatively determine the current depth in order to determine whether the diver has passed a desired vertical depth change notification distance, or in other words determine whether the current depth is a multiple of the desired vertical depth change notification. For example, the processing element 126 may perform a division function to determine whether the current depth is generally a multiple of the desired vertical depth change notification distance. Specifically, the processing element 126 may determine whether the current depth divided by the desired vertical depth change notification distance has a remainder. The processing element 126 may alternatively determine whether the diver or housing 112 has passed a desired vertical depth change notification distance by comparing the current depth to a previously stored reference depth. Other algorithms, functions, or processes may be employed to determine whether the current depth is a multiple of the desired vertical depth change notification (that an interval distance has been passed) without departing from the scope of the claimed subject matter.

The processing element 126 may store the determined current depth on the memory element 124. The processing element 126 may determine the current depth on a periodic basis and store the determined current depth on the memory element 124 in association with a time at which the current depth was determined and/or when the water pressure electronic signal 134 was received. In other words, the processing element 126 may track the determined depth over time.

At times, the processing element 126 may determine a change in depth based on a difference between a determined current depth and at least one previously determined depths stored on the memory element 124. The processing element 126 may determine the change in depth on a continuous or periodic basis to determine a current rate of change in depth, or rate of descent/ascent. The processing element 126 may also determine whether the change in depth is an ascending change of depth or a descending change of depth. The processing element 126 may also store the rate of change in depth over time on the memory element 124.

The processing element 126 controls the feedback device 122 to generate the vibration in a pattern indicative of a rate of change in depth based at least in part on the determined current depth. The processing element 126 outputs or generates the transmit electronic signal 136 which is received by the feedback device 122. In some embodiments, the processing element 126 may further include, or be in electronic communication with, electronic signal processing components such as waveform generators, amplifiers, filters, ADCs, digital-to-analog converters (DACs), and the like. The electronic signal processing components may allow the processing element 126 to generate the periodic waveform voltage that will directly drive the feedback device 122.

The pattern indicative of the rate of change may be a pattern by which the diver can intuit or estimate their ascent and/or descent rate. For example, the pattern indicative of the rate of change in depth may include a vibration whenever the current depth is a multiple of the desired vertical depth change notification distance. This enables the diver to intuit their rate of ascent or descent by knowing that the closer the beeps are in time, the faster the diver is moving. This also enables the diver to estimate an actual depth by counting the number of vibrations and multiplying the number of vibrations by the desired vertical depth change notification distance.

The pattern indicative of the rate of change in depth may additionally or alternatively be related to the rate of change in depth. For example, the pattern may include a number of vibrations generated over a period of time with the number of vibrations being proportional to the rate of change of depth. The pattern may include a frequency of the vibration being associated with the rate of change of depth. In such embodiments where the feedback device 122 comprises a transducer, the pitch of the tone may be adjusted based on the rate. For example, the tone may be higher for a higher rate of change. In such embodiments where the feedback device 122 comprises a haptic feedback device, the frequency of the haptic vibrations may be adjusted based on the rate. Alternatively or additionally, the pattern may include an amplitude of the vibration being associated with the rate of change of depth. For example, the volume of an audible tone may increase or decrease with rate and/or the intensity of a haptic vibration may increase or decrease with the rate.

In some embodiments, the pattern indicative of the rate of change may comprise a vibration when the rate of change in depth exceeds the stored rate of depth change notification threshold.

The pattern indicative of the rate of change may comprise features that enable the diver to distinguish between a descending rate of change or an ascending rate of change. For example, the processing element 126 may control the feedback device 122 to generate an audible tone when rate is indicative of a descending rate and generate a haptic vibration when the rate is indicative of an ascending rate. Additionally or alternatively, for example, the processing element 126 may control the feedback device 122 to generate tones with different pitches for distinguishing between a descending rate or an ascending rate.

It is possible that the processing element 126 may vary other aspects of the vibrations to indicate depth parameters without departing from the scope of the claimed subject matter. For example, the processing element 126 may control the display 114 to emit a flash of light in a pattern indicative of a rate of change of depth.

The processing element 126 may also include in the transmit electronic signal 136 to the feedback device 122 depth information and/or ascent or descent rate for relaying to the tank pod 12, which may then relay the depth information and/or ascent or descent rate to other devices and users. For example, the depth information and/or ascent or descent rate may be relayed to devices of a user in a boat or otherwise outside the water. The processing element 126 may also utilize the communication element 118 to transmit information, including diver depth information and descent/ascent rate, to other devices without requiring use of the tank pod 12.

The processing element 126 may also receive the receive electronic signal 138 from the feedback device 122 when the scuba tank pod 12 transmits data. The receive electronic signal 138 may have an electric voltage and/or an electric current frequency and amplitude, as well as other waveform characteristics, that correspond, or vary according, to the sonar waves that impinge surfaces of the feedback device 122. The receive electronic signal 138 may be processed by the electronic signal processing components of the processing element 126 to be converted to digital data.

The processing element 126 may also control the display 114 to show information regarding the depth and/or rates of changes of depth. The information may be updated on the display 114 shortly after it is received and/or determined by the processing element 126.

The wearable electronic device 14 may function or operate, at least in part, as follows. The user interface 116 receives an input representative of a selection of a desired vertical depth change notification distance, which the processing element 126 stores on the memory element 124. The user interface 116 may also receive an input representative of a selection of a rate of depth change notification threshold, which the processing element 126 stores on the memory element 124. The user interface 116 may also receive an input representative of a selection of a type of pattern indicative of the rate of change of depth. For example, the selection may be to output a vibration when the current depth is a multiple of a desired vertical depth change notification distance, or the selection may be to output a number of vibrations over a period of time that is proportional to a rate of change of depth. Additionally, the user interface 116 may receive inputs representative of selections of customizations of the pattern indicative of the rate of change or the vibration itself, such as pitches of tones, tones versus vibrations, characteristics that help distinguish between ascending and descending rates, and so forth. The processing element 126 stores these selections on the memory element 124.

The depth sensor 123 generates a signal 134 representative of the water pressure and therefore depth of the wearable electronic device 14. The processing element 126 receives the signal, determines the current depth, and stores it on the memory element 124.

The processing element 126 stores the determined depths on the memory element 124 and may determine changes in depth based on the stored determined depths. The processing element 126 may determine whether the changes in depth indicate an ascending change in depth or a descending change in depth. The processing element 126 may then determine if the current depth is a multiple of the vertical depth change notification distance. If the current depth is a multiple of the vertical depth change notification distance, then the processing element 126 sends a transmit electronic signal 136 to the feedback device 122 or otherwise drives or controls the feedback device 122 to generate a vibration. The vibration may also be indicative of whether the change of depth is an ascending or descending change of depth.

Alternatively, depending on the user interface selections or the embodiment, the processing element 126 may determine the rate of change of depth and send a transmit electronic signal 136 to the feedback device 122 or otherwise drive or control the feedback device 122 to generate a number of vibrations over a period of time that is proportional to the rate of change of depth. The vibrations may also be indicative of whether the rate of change of depth is an ascending rate of change of depth or a descending rate of change of depth.

If the processing element 126 determines the rate of change of depth is beyond the rate of depth change notification threshold, then the processing element 126 may send a transmit electronic signal 136 to the feedback device 122 or otherwise drive or control the feedback device 122 to generate a vibration indicative of the threshold being exceeded.

The processing element 126 may also communicate with the pod 12 via the feedback device 122 and/or the communication element 118. The processing element 126 may also communicate with other devices via the feedback device 122, the communication element 118, and/or relayed through the pod 12. The communication may include the current depth, previously stored depths, ascent or descent rates, a notification indicative of an ascent or descent rate that exceeds the rate of depth change notification threshold, or the like.

Although the technology has been described with reference to the embodiments illustrated in the attached drawing figures, it is noted that equivalents may be employed and substitutions made herein without departing from the scope of the claimed subject matter.

Having thus described various embodiments of the technology, what is claimed as new and desired to be protected by Letters Patent includes the following:

1. A wearable electronic device for providing feedback associated with a diving activity, the wearable electronic device comprising:

- a housing;
- a feedback device located in the housing and configured to generate a vibration;
- a depth sensor configured to generate a signal indicative of a current depth of the housing;
- a processing element in electronic communication with the feedback device and the depth sensor, the processing element configured to:
  - determine the current depth based on the signal indicative of a current depth, and
  - control the feedback device to generate the vibration in a pattern indicative of a rate of change in depth based at least in part on the current depth;

wherein the pattern indicative of the rate of change in depth includes a number of vibrations output over a period of time, the number of vibrations being proportional to the rate of change in depth.

2. The wearable electronic device of claim 1, further comprising a memory element located in the housing and configured to store at least one previously determined depth, wherein the processing element is further configured to determine a change in depth based on a difference between the determined current depth and the at least one previously determined depth.

3. The wearable electronic device of claim 2, wherein the pattern indicative of the rate of change in depth comprises:

- a first vibration pattern associated with an ascending change of depth, and
- a second vibration pattern associated with a descending change of depth.

4. The wearable electronic device of claim 2, wherein the processing element is further configured to determine a rate of change in depth based at least in part on the determined change in depth.

5. The wearable electronic device of claim 4, wherein the memory element is further configured to store a rate of depth change notification threshold on the memory element, wherein the processing element is further configured to control the feedback device to generate a second pattern indicative of the rate of change in depth comprising a second vibration when the rate of change in depth exceeds the stored rate of depth change notification threshold.

6. The wearable electronic device of claim 4, wherein the pattern indicative of the rate of change in depth includes a frequency of the vibration that is associated with the rate of change of depth.

7. The wearable electronic device of claim 1, wherein the feedback device comprises at least one of:

- a transducer, wherein the vibration comprises an audible tone, or
- a haptic feedback device, wherein the vibration comprises a haptic vibration.

8. The wearable electronic device of claim 1, wherein the pattern indicative of the rate of change in depth comprises an additional vibration when the current depth is a multiple of a desired vertical depth change notification distance.

9. The wearable electronic device of claim 1, wherein the depth sensor includes at least one of an accelerometer and a pressure sensor.

10. A wearable electronic device for providing feedback associated with a diving activity, the wearable electronic device comprising:

- a housing;
- a feedback device located in the housing and configured to generate a vibration;
- a depth sensor configured to generate a signal indicative of a current depth of the housing;
- a memory element located in the housing and configured to store at least one previously determined depth;
- a processing element in electronic communication with the feedback device, the depth sensor, and the memory element, the processing element configured to:
  - determine the current depth based on the signal indicative of a current depth,
  - determine a rate of change in depth based at least in part on a difference between the determined current depth and the at least one previously determined depth, and
  - control the feedback device to generate the vibration in a pattern indicative of the rate of change in depth wherein the pattern indicative of the rate of change in depth includes a number of vibrations output over a period of time, the number of vibrations being proportional to the rate of change in depth.

11. The wearable electronic device of claim 10, wherein the pattern indicative of the rate of change in depth includes a frequency of the vibration, the frequency of the vibration being related to the determined rate of change of depth.

12. The wearable electronic device of claim 10, wherein the pattern is a first pattern, and the processing element is further configured to:

store a rate of depth change notification threshold on the memory element, and control the feedback device to generate a vibration in a second pattern when the rate of change in depth exceeds the stored rate of depth change notification threshold.

13. The wearable electronic device of claim 10, wherein the pattern indicative of the rate of change in depth comprises:

a first vibration pattern associated with an ascending change of depth, and a second vibration pattern associated with a descending change of depth.

14. A wearable electronic device for providing feedback associated with a diving activity, the wearable electronic device comprising:

a housing;

a feedback device located in the housing and configured to generate a vibration;

a depth sensor configured to generate a signal indicative of a current depth of the housing;

a memory element located in the housing and configured to store a vertical depth change notification distance;

a processing element in electronic communication with the feedback device, the depth sensor, and the memory element, the processing element configured to:

determine the current depth based on the signal indicative of a current depth, determine a rate of change in depth based at least in part on the determined current depth, control the feedback device to generate the vibration when the current depth is a multiple of the vertical depth change notification distance, and control the feedback device to generate a second vibration in a pattern indicative of a rate of change in depth, wherein the pattern indicative of the rate of change in depth includes a number of vibrations output over a period of time, the number of vibrations being proportional to the rate of change in depth.

15. The wearable electronic device of claim 14, further comprising a user interface configured to receive a selection of the vertical depth change notification distance.

16. The wearable electronic device of claim 14, wherein the feedback device comprises at least one of:

a transducer, wherein the vibration comprises an audible tone, or a haptic feedback device, wherein the vibration comprises a haptic vibration.

17. The wearable electronic device of claim 14, wherein the processing element is configured to:

determine a change in depth based on a difference between the determined current depth and a previously determined depth, determine if the change in depth is ascending or descending, and control the feedback device to generate the vibration in at least one of a first pattern associated with an ascending change of depth or a second vibration pattern associated with a descending change of depth.

18. The wearable electronic device of claim 17, wherein the processing element is further configured or programmed to:

determine a rate of change of depth based at least in part on a difference between the determined current depth and a previously determined depth, and store on the memory element the rate of change of depth.

* * * * *